Jan. 26, 1971  J. CUTRONA  3,557,451

INDEX NOTCH CUTTING DEVICE

Filed March 18, 1969  2 Sheets-Sheet 1

INVENTOR.
JOSEPH CUTRONA

BY Woodling, Krost, Granger and Rust.

ATTORNEYS

Jan. 26, 1971  J. CUTRONA  3,557,451
INDEX NOTCH CUTTING DEVICE
Filed March 18, 1969  2 Sheets-Sheet 2

INVENTOR.
JOSEPH CUTRONA
BY
ATTORNEYS.

United States Patent Office 3,557,451
Patented Jan. 26, 1971

3,557,451
INDEX NOTCH CUTTING DEVICE
Joseph Cutrona, Cleveland, Ohio, assignor to The World Publishing Company, Cleveland, Ohio, a corporation of Ohio
Filed Mar. 18, 1969, Ser. No. 808,233
Int. Cl. B26b 17/00
U.S. Cl. 30—180                         12 Claims

ABSTRACT OF THE DISCLOSURE

A device for cutting index notches or thumb recesses in selected pages of bound books wherein a cutting knife is driven toward an anvil by pneumatic pressure upon manual actuation of a valve stem in one direction to open a control valve and in which the valve stem is quickly released in response to resiliency of the compressed air in the valve after completion of the manual operation so as to permit quick removal of the knife away from the anvil, the quick release of the valve stem being obtained by a trigger mechanism formed and arranged to permit the valve stem to move to closed position immediately after its initial manual actuation toward opening of the control valve.

---

An object of my invention is to provide a very fast acting pneumatically powered index notch cutting device which moves away in non-cutting portion of the complete cycle immediately after completion of the cutting portion of the cycle.

Another object is the provision of a unique triggering mechanism for the control valve of a pneumatically operated tool which closes the valve, after being opened to drive the tool, faster than ordinarily possible by the human reflexes of the operator actuating the valve.

Another object is to provide a cutting hand tool that is faster and more efficient than comparable tools, and which is adapted particularly for the cutting of index notches in books.

Other objects and a fuller understanding of this invention may be had by referring to the following description and claims, taken in conjunction with the accompanying drawings, in which:

Figure 1:
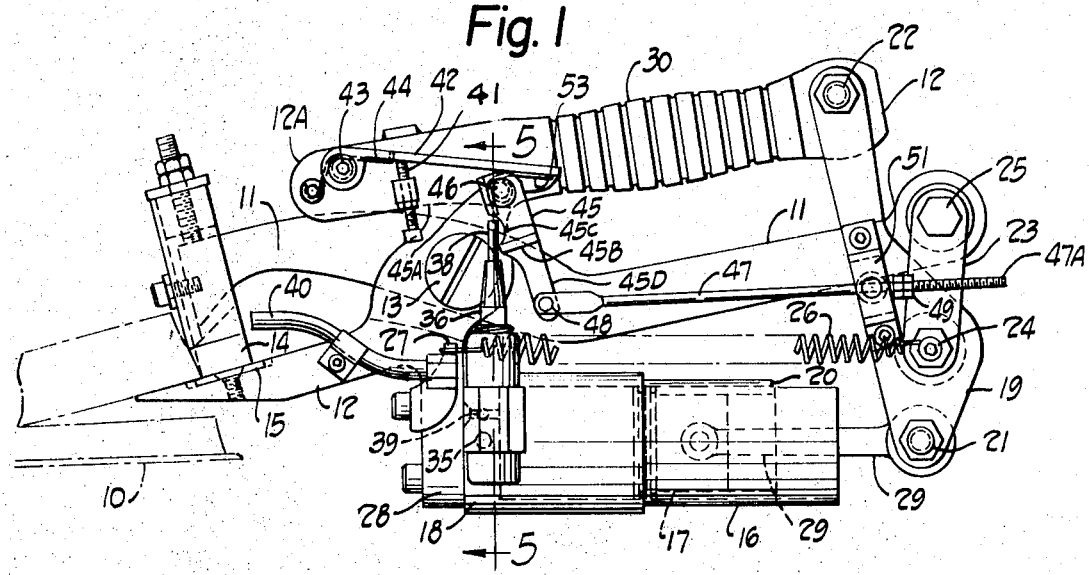
FIG. 1 is an elevational view of the left side of a preferred form of my improved device, and showing it in the position of just having completed a cutting operation in the leaves of a book.

The preferred form of my tool as disclosed in the drawings has a pair of pivoted arm members 11 and 12 which cross each other at the pivot point provided by a pivot pin 13. As in the usual scissor action, movement of the rear ends of the arm members 11 and 12 toward each other causes the forward ends of the arm members to move toward each other. The arm member 11 carries a cutting knife 14 on its forward end which faces, and co-operates with, an anvil 15 carried at the forward end of the other arm member 12. The cutting knife 14 is semicircular in cross-section and has a lower edge adapted to cut into paper or the like upon the knife 14 being brought forcefully down against the anvil 15.

A particular use for my tool is the cutting of notches or recesses in the edges of certain pages of books, such as a dictionary, a Bible, and reference books wherein some indicia is labelled to the edge portions or certain pages and the notch or recess is provided to make the indicia visible. My improved tool is particularly adapted for the fast and accurate cutting out of these well-known notches in the edge portions of books.

A piston and cylinder assembly is secured to the arm member 11 and disposed parallel to the same closely below the arm member 11. The piston and cylinder assembly comprising a cylinder 16 within which a piston 17 is reciprocal in the usual manner upon the receipt of air under pressure to the forward part of the cylinder so as to press the piston rearwardly. The forward wall 18 of the cylinder 16 is adapted to accommodate the conduits or passageways to and from the interior of the cylinder. The cap 28 is secured to the front wall 18 of the cylinder by the usual cap screws. Connected to and extending rearwardly from the piston 17 there is a piston crank arm 29, which reciprocates and swings in the usual manner as the piston 17 is reciprocated.

Pivotally secured by the pivot pin 21 to the piston crank arm 29 is a link 19 which has its upper end pivotally connected by the pivot pin 22 to the rearward end of arm member 12. The upper rearward wall of the cylinder 16 above the rearward end of the crank arm 29 is provided with a longitudinal notch 20 to accommodate the link 19. The link 19 is formed in two parallel parts so as to straddle the rearward end of the piston crank arm 29 and the rearward end of the arm member 12.

As seen in the drawing the link 19 has an offset portion or elbow 19A. Pivotally connected to this portion 19A of link 19 by means of a pivot pin 24 is a second link 23 which is also comprised of two parallel parts. The upper end of link 23 is pivotally connected by means of pivot pin 25 to the readward end of the other arm member 11. The pivotal connection, the configuration of the parts, and the arrangement are such that the arm members and the several links swing between the position shown in FIG. 1 and the position shown in FIG. 2.

Figure 2:
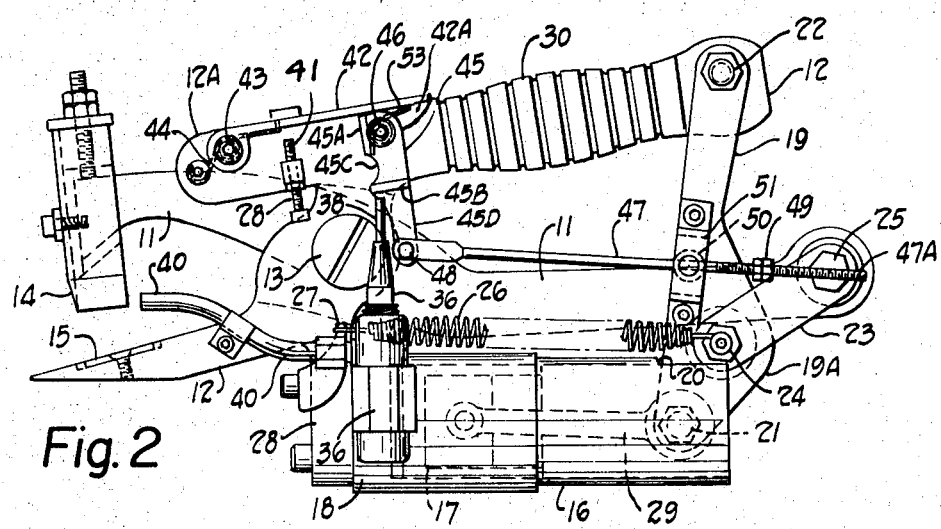
FIG. 2 is a view comparable to that of FIG. 1 and in which the device is shown in its withdrawn position after completion of the cutting portion of the complete cycle.
Figure 3:
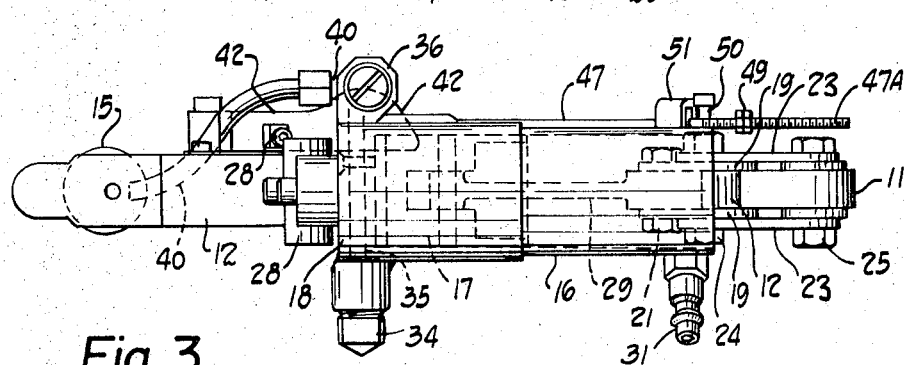
FIG. 3 is a bottom plan view looking upward on the bottom of the view in FIG. 2.
Figure 4:
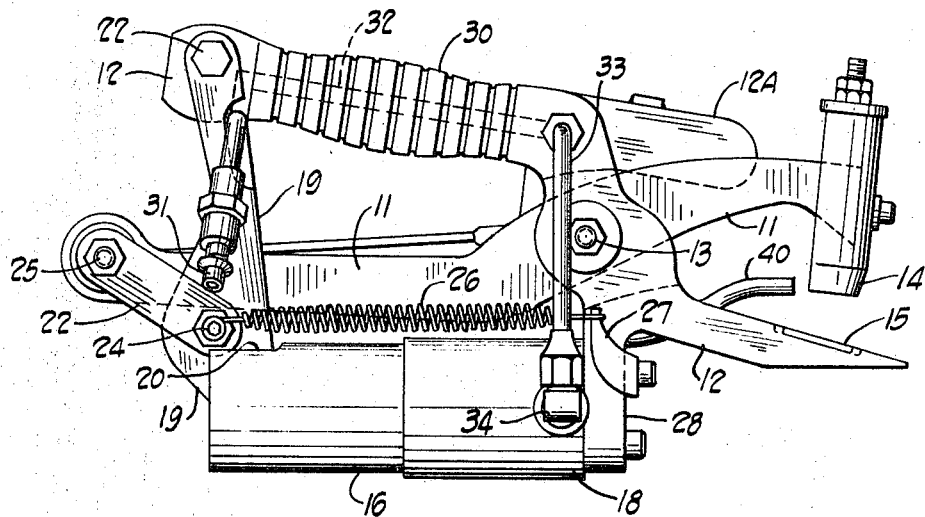
FIG. 4 is an elevational view of the right side of the device, opposite that of FIGS. 1 and 2, and as in FIG. 2 shows the device in its withdrawn position.

A pair of coil springs 26 are provided to resiliently urge the parts in the position illustrated in FIG. 2, that is with the piston 17 in its forward position within the cylinder 16. These coil springs 26 on opposite sides of the device have their rear ends, respectively, anchored to the pivot pin 24 and their forward ends, respectively, anchored to an anchor member 27 which is secured to the cap 28 by the upper cap screws shown. Thus, the tension on the springs 26 is such as to urge the parts to the position shown in FIG. 2 and to resiliently oppose their movement to the position shown in FIG. 1.

The arm member 12 is provided with a handle portion 30 which is generally round in cross-section and has a plurality of grooves extending therealong to aid in the non-slip gripping of the handle. Also, the grooves provide means for attaching an auxiliary supporting cable to aid in carrying the weight of the tool in its operation. The cable may be adjustably secured in any one of the desired grooves so as to obtain the balance desired.

On the left side of the device there is a coupling connection 31 adapted to be connected to a hose or flexible conduit which in turn is connected to a source of compressed air. The coupling connection 31 in turn communicates with a conduit 32 extending through the handle 30 and forwardly to where it emerges and communicates with a downwardly extending conduit 33. This conduit 33 in turn is connected to an L coupling 34 which is connected to the forward end portion 18 of the cylinder 16 whereby the conduit 33 communicates with a conduit 35 extending transversely through the forward end portion 18 as better seen in FIG. 5. The end portion 18 of the cylinder 16 also has a conduit 39 extending therein and which communicates with the interior of the cylinder 16 in advance of the piston 17 and thereby affords communication with the interior of the cylinder. Secured, as by welding, to the side of the forward end portion 18 of cylinder 16 is a valve housing 36 having its axis disposed vertically, that is normal to the axis of the transverse opening 35. The valve housing 36 has its lower end closed by a closure 36A threadably secured thereto. The upper end of the valve housing 36 is closed by an upper closure 36B, save for a bore extending therethrough for accommodating a movable piston valve plunger 38 and so as to permit axial movement of the plunger 38 through the closure 36B.

Figure 6:
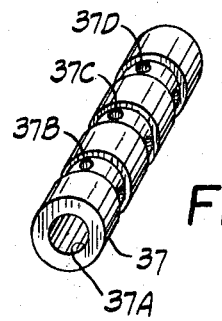
FIG. 6 is a perspective view of the fixed valve seat portion of the control valve in my device.

Positioned within the valve housing 36 and held in position there between closures 36A and 36B is a valve seat member 37 of general cylindrical form fitting closely the bore of the valve housing 36. This seat member 37 is shown in perspective in FIG. 6. There are three annular spaced grooves extending along the length of the seat member 37 and extending axially through the seat member 37 is a bore 37A. At each of the annular grooves there is a set of transverse openings through the seat member 37. There is a set of transverse openings 37B through the seat member 37 at the location of the lower annular groove; there is a set of transverse openings 37C through the seat member 37 at the location of the intermediate annular groove; and there is a set of transverse openings 37D at the location of the upper annular groove of seat member 37. These several transverse openings communicate with the bore 37A of seat member 37.

Disposed axially of the seat member 37 is the piston valve plunger 38 which has an upper end 38A; an enlarged cylindrical portion 38B; and another or lower enlarged cylindrical portion 38D. The enlarged cylindrical portions 38B and 38D closely complement in a sliding fit the bore 37A of the seat member 37. The piston plunger 38 has reduced diameter intermediate the portion 38B and the portion 38D to provide a longitudinal passageway 38C through the seat member 37 and around the reduced portion so described.

Figure 5:
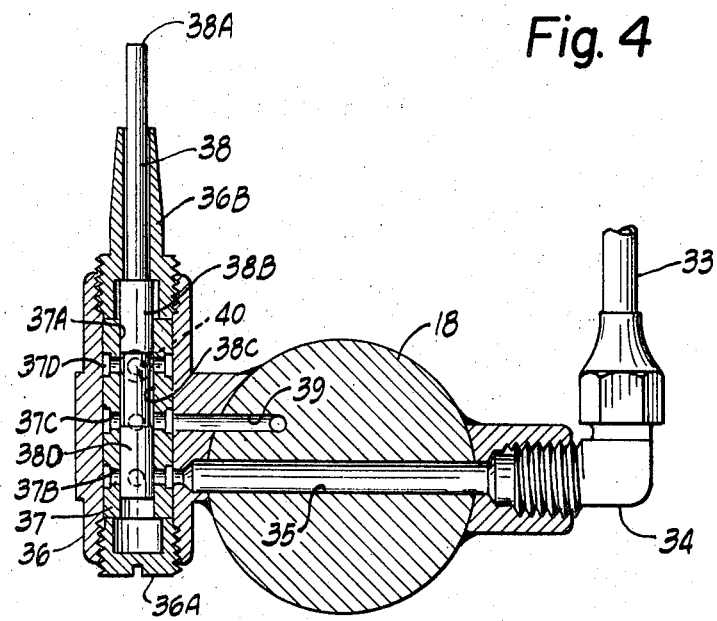
FIG. 5 is an enlarged cross-sectional view of the valve and associated passageways of my device and taken through 5—5 of FIG. 1.

The resilient nature of the compressed air entering the valve housing 36 through the conduit 35 and down through the openings 37B into the lower portion of the valve housing 36 is such as to resiliently urge or bias the piston plunger 38 upwardly, thus toward its position illustrated in FIG. 5. When in this position the valve is closed as compressed air cannot move upwardly in the valve body by reason of the position of the enlarged portion 38D of the piston plunger blocking upward movement of the air. When in this position compressed air is not admitted to the cylinder 16 through the opening 39.

Communicating with, and secured to, the valve housing 36 on the forward side thereof is a conduit 40 which extends around to discharge air flowing through the conduit 40 against the rearward portion of the knife 14 and thus to blow away by air pressure the small pieces of cut paper at the end of the knife after each cutting operation. A blast of air comes out of the forward end of the conduit 40 after the completion of each cutting operation so as to quickly remove the small pieces of paper and to clear the device for the next cutting operation.

There is provided a unique triggering mechanism for the operation of the control valve of my device. There is a first trigger portion 42 in the form of a flat plate which is pivotally connected by means of a pivot pin 43 to the forward end portion 12A of arm member 12. A small flat spring 44, suitably anchored, is arranged about the pivot pin 43 so as to resiliently urge the trigger portion 42 upwardly, that is toward its position shown in FIG. 2. Near the rear free end of the trigger portion 42 there is a small downwardly extending flange portion 42A and pivotally connected to this flange portion 42A by means of a pivot pin 46 is a second trigger portion 45 normally disposed at right angles to the first trigger portion 42, as shown in FIG. 2. A small leaf spring 53, arranged around the pivot pin 46 and suitably anchored, resiliently urges or biases the second trigger portion 45 to said normal position, that is the position shown in FIG. 2.

The second trigger portion 45 has an upper flange portion 45A disposed and anchored to the main portion of the trigger portion 45 along the forward edge thereof near the pivot pin 46. The second trigger portion 45 also has a horizontally disposed abutting portion 45B extending out at right angles to the main portion of the trigger portion 45 at about intermediate of its ends. This abutting portion 45B is positioned over the axis of valve plunger 38 when the trigger portion 45 is in its normal position shown in FIG. 2 whereby downward movement of the second trigger portion 45 presses the lower surface of abutting portion 45B downwardly upon the top end 38A of valve plunger 38 so as to depress the same against the resilient bias of the compressed air within the valve housing 36. The abutting portion 45B thus provides a ledge for engaging and actuating the valve plunger stem 38 upon downward actuation of the trigger mechanism and to thus admit compressed air into the cylinder 16.

Formed in the forward edge or wall of the second trigger portion 45 just above the abutting portion 45B is a recess or notch 45C. This recess 45C accommodates the upper end portion of the piston plunger 38 when the second trigger portion 45 is swung rearwardly such as illustrated in FIG. 1. The piston valve plunger 38 is thus free to move upwardly to the full extent of its movement within the valve housing 36 and to thus assume its closed position illustrated in detail in FIG. 5. The surface of the second trigger portion 45 from the lower surface of abutting portion 45B and to the recess 45C is rounded and smooth so as to provide a smooth friction-resistant sliding surface for the top end of the valve plunger stem 38 to move from its position shown in FIG. 2 to its position shown in FIG. 1 as the second trigger portion 45 is swung from its position shown in FIG. 2 to its position shown in FIG. 1. Thus the valve plunger stem 38 might quickly and easily move upwardly under the urging of compressed air in the valve housing 36 upon the swinging of the trigger parts to the position shown in FIG. 1 and thus to rapidly close the valve before the first trigger portion 42 has had an opportunity of moving upwardly from the position shown in FIG. 1 to its normal position shown in FIG. 2.

Pivotally connected to the lower end portion 45D of the second trigger portion 45 by means of a pivot pin 48 is a connecting rod 47 extending longitudinally of the device. The connecting rod 47 has a rearward threaded portion 47A upon which are threadably engaged adjusting stop nuts 49. By moving the nuts 49 in the usual manner and locking them in position an adjustable stop is provided along the length of the rod 47. The connecting rod 47 extends through a slide bearing 50 carried by a metal strap 51 secured to the side of link 19. The slide bearing 50 is such as to permit longitudinal sliding movement of the rod 47 through the bearing 50 and at the same time the bearing 50 may pivot or rock in the strap 51 to accommodate the swinging movement of the link 19 as the device is operated. Upon the stop nuts 49 engaging the slide bearing 50 the rod 47 is pulled rearwardly upon the link 19 being moved toward its position shown in FIG. 1. Thus upon the parts moving from their position shown in FIG. 2 to their position shown in FIG. 1 the second trigger portion 45 is automatically swung from the position shown in FIG. 2 to the position shown in FIG. 1 by the pull of the rod 47.

To provide an adjustable stop for the first trigger portion 42 there is an adjustable bolt 41 secured to the forward end portion 12A of the second arm member 12. By adjusting the position of this bolt, the downward limit of movement of the first trigger portion 42 may be determined.

The operation of the device is here described with the assumption that the handle 30 has been gripped by the operator's right hand and with the operator's thumb positioned over the first trigger portion 42 while the parts are in the position shown in FIG. 2. The device is then moved against the edge of a book so that the knife 14 is disposed over certain pages of the book to be notched. In FIG. 1 a portion of a book has been indicated by the reference character 10. With the parts in the position shown in FIG. 2 and the pages of a book to be cut thus engaged by knife 14 the operator's right thumb presses downwardly upon the top of the first trigger portion 42 so as to swing it downwardly. This causes the abutting portion 45B of the second trigger portion 45 to engage and press downwardly on the top of the valve plunger stem 38 and to this move the valve parts, against the resilient urging of the compressed air in the valve housing, to a position to cause compressed air from the conduit 35 to be admitted through conduit 39 into the interior of cylinder 16 and thus to move the piston 17 rearwardly. Immediately upon the parts being swung from the position of FIG. 2 to the position of FIG. 1 by reason of the actuation thereon by the piston and cylinder assembly, the connecting rod 47 swings the second trigger portion 45 rearwardly and thus to permit the upper end of the valve plunger stem 38 to slide upwardly from under the abutting portion 45B into the recess 45C and thus released of all constraint. The valve is thus very quickly operated to close off flow of compressed air into the cylinder. At the same time the air in the cylinder is bled off through the conduit 39 and up through the valve housing 36 through the longitudinal passageway 38C and out through the conduit 40 where it is utilized to blow the cut paper bits away from the knife 14. The tension of the two coil springs 26 quickly moves the parts back from the position of FIG. 1 to that of FIG. 2. The device is then ready for another cycle of operation.

By reason of the unique trigger mechanism the control valve is quickly moved to its closed position and to a position to release compressed air from the cylinder faster than human reflexes permit the thumb to be raised upwardly from the top of the first trigger portion 42. Without this unique arrangement of the parts the cycle of operation would be much longer and would depend upon how fast the human operator could raise his thumb upwardly so as to release the valve and to permit it to be closed by the resilient action of the compressed air. It has been found that the operation of cutting notches is greatly speeded up as the release of the valve stem is so fast after the knife has cut the paper and the parts so quickly resume their normal position ready for the next cutting operation. When the upward movement of the human thumb is required to release the valve and thus have it automatically closed it takes several times longer for the valve stem 38 to be totally disengaged and the valve closed by the resilient action of the compressed air. Thus by the unique arrangement of parts the notching operation, such as the cutting of index notches and recessing books, has been greatly speeded up and efficiency and accuracy has been improved. Also muscular fatigue of the operator has been reduced as the release of the control valve has been accomplished with a minimum of manual effort and with slower response of reflexes than would otherwise be required.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An index notch cutting device comprising a pair of pivotally connected arm members, the first of said arm members being adapted to carry a cutting knife on its forward end and the second of said arm members being adapted to carry an anvil on its forward end for coacting with the cutting knife in the cutting of material upon the pivotal swinging of one arm member relative to the other arm member, said arm members being resiliently biased relative to each other to pivotally swing in a first direction to move the cutting knife away from the anvil, a pneumatic cylinder and piston assembly carried by one of said arm members, link means operatively connecting said assembly and the other of said arm members to cause the arm members to pivotally swing relative to each other in an opposite direction upon actuation of said assembly and thereby move said cutting knife and anvil toward each other, a valve member adapted to be connected to a source of compressed air and operatively connected to said assembly to control the flow of compressed air to and from said assembly and the actuation thereof, said valve member including a reciprocal valve stem resiliently biased to protrude from the valve member by compressed air in the valve body, the valve stem upon being depressed in opposition to the said resilient bias admitting compressed air to said assembly to actuate the same in said opposite direction to move the cutting knife toward the anvil, the valve stem upon being released to protrude from the valve member under said resilient bias terminating the admission of compressed air to the said assembly and releasing compressed air therein to permit the said arm members to swing in said first direction and thereby to move the cutting knife away from the anvil, a trigger mechanism having a first portion pivotally carried by one of arm members in position to be manually operated by the operator of the device, said first portion being resiliently biased toward non-operative position, said trigger mechanism having a second portion pivotally carried by said first portion and resiliently biased toward an operating position aligned with said valve stem to abut, and to depress, said valve stem upon manual operation of said first portion, and a connecting member operatively connected to said second portion and said link means and arranged to move said second portion away from said operating position upon the movement of the link means by said assembly and the pivotal swinging of the arm members relative to each other in said opposite direction, said second portion being formed to clear said valve stem and to permit the said valve stem to protrude under the resilient bias of said compressed air from said valve member upon the said connecting member moving the second portion away from said operating position.

2. A device as claimed in claim 1 and wherein said connecting member includes a rod between said second portion and said link means and includes lost-motion means to permit the second portion to remain in said operating position until said link means has been moved a predetermined distance by said assembly.

3. A device as claimed in claim 2 and wherein said second portion of the trigger mechanism and said rod are pivotally connected, and said second portion has an abutting face disposed intermediate the pivotal connection with said rod and the pivot connection of the second portion with the first portion of the trigger mechanism, said abutting face being positionable to engage the end of the said valve stem upon the second portion being in said operating position, the said second portion having an open space formed therein adjacent said abutting face to accommodate said valve stem therein upon the said second portion being moved from said operating position by said connecting member.

4. A device as claimed in claim 1 and including a handle carried by the said second arm member, and said trigger mechanism is carried by said second arm member in position to be manually operated with the thumb of the operator holding said handle, and the said cylinder and piston assembly is carried by said second arm member at a location spaced from said handle, the said first arm member being movable between said assembly and handle and in a plane coinciding therewith.

5. A triggering mechanism for a pneumatic operated index-notch cutting tool having a pneumatic control valve stem disposed to extend to valve-closing position by pneumatic resilient pressure toward the mechanism, said mechanism having a first portion pivotally carried by the tool, said first portion having a free end positioned to be depressed to operating position by the operator holding the tool, a first spring connected to said first portion and arranged to resiliently urge the free end away from operating position, said triggering mechanism having a second portion pivotally carried by said first portion to be moved by movement of said first portion to swing between an aligned position aligned with said valve stem to be abuttable thereagainst and a non-aligned position not aligned with said valve stem to clear the same, said second portion in aligned position upon being moved against the abutted valve stem by movement of the first portion to operating position depressing the valve stem to valve-opening position, a second spring connected to said second portion and arranged to resiliently urge the second portion to said aligned position, and connecting means connected to said second portion and to said tool and arranged to pivotally swing said second portion against the bias of said second spring toward said non-aligned position to clear the valve and to permit the valve stem to move to valve-closing position upon said tool being pneumatically operated to complete an index-notch cutting operation, the said valve stem being depressible by the second portion in its said aligned position by depression of the first portion to its said operating position, the clearing of said valve stem by the second portion pivotally swung to non-aligned position by said connecting means permitting the valve stem to extend under the resilient force of said pneumatic pressure to valve-closing position.

6. A triggering mechanism as claimed in claim 5, wherein said second portion of the mechanism has a flat abutting face portion disposed generally normal to the axis of said valve stem upon the said second portion being in said aligned position, and wherein said second portion has a pocket formed therein along a side thereof and positioned to accommodate in said pocket the free end portion of said valve stem upon said second portion being moved to said non-aligned position and the said abutting face portion clearing said valve stem to permit the valve stem to extend to valve-closing position.

7. A triggering mechanism as claimed in claim 6, wherein said flat abutting face portion extends a first distance along a line coinciding with the axis of the valve stem and said second portion upon the second portion being in said aligned position, and wherein said pocket extends a second distance along a line coinciding with the axis of the valve stem and said second portion upon the second portion being in said non-aligned position, the said second distance being substantially greater than said first distance and being sufficient to accommodate said valve stem therein upon being extended to valve-closing position.

8. A triggering mechanism as claimed in claim 7 and in which the surface of the second portion engaged by the free end of the valve stem while moving from engagement with said flat face portion in the said valve-opening position of the valve stem into said pocket to the said valve-closing position is rounded to facilitate the read sliding of said free end of the valve stem into said pocket upon the said second portion being moved to said non-aligned position.

9. In a pneumatically actuated tool having a movable part movable in one direction upon actuation of the tool in a working stroke and movable in an opposite direction upon actuation of the tool in a withdrawing stroke, the tool having a pneumatic valve member for controlling the actuation of the tool, the valve member having a piston stem extendable therefrom under the resilient bias of the compressed air in the valve member to valve-closing position and depressible in opposition to said resilient bias to valve-opening position, the combination of a first trigger portion pivotally connected to said tool to permit swinging of a free end thereof toward and away from said valve stem, said first trigger portion being resiliently biased away from said valve stem, a second trigger portion pivotally carried by said first trigger portion adjacent said free end thereof intermediate said first trigger portion and said valve stem, said second trigger portion being pivotally swingable between an aligned position in axial alignment with said valve stem and a non-aligned position at an angle to the axis of said valve stem, said first trigger mechanism being resiliently biased toward said aligned position, connecting means operatively connecting said second trigger portion and said movable part of the tool to swing said second trigger portion to said non-aligned position upon said tool part being moved in said one direction a predetermined distance and to permit the second trigger portion to return to said aligned position upon said tool part being moved in said opposite direction said predetermined distance, said second trigger portion having an abutting portion disposed to abut the free end of said valve stem upon the second trigger portion being in said aligned position and to depress the valve stem upon the first trigger portion being moved toward said valve stem, said second trigger portion being formed to have said abutting portion clear said valve stem and to permit said valve stem to extend freely from said valve member immediately upon said tool part and connecting means moving the second trigger portion to non-aligned position.

10. The combination claimed in claim 9 and in which said abutting portion of the second trigger portion is disposed in a plane substantially normal to the axis of said valve stem upon the said second trigger portion being disposed in aligned position, and in which said second trigger portion is provided in a side thereof with a recess intermediate said abutting portion and said first trigger portion and disposed to accommodate therein the free end of said valve stem upon said second trigger portion being moved to non-aligned position.

11. The combination claimed in claim 10 and in which the longitudinal extent of said abutting portion along said second trigger portion is substantially less than the longitudinal extent of said recess along said second trigger portion to permit for lesser movement of the valve stem in moving past said abutting portion to said recess than in moving into extended position and accommodated in said recess upon the second trigger portion being moved to non-aligned position.

12. The combination claimed in claim 11 and in which said second trigger portion has a smooth rounded surface along said side thereof from said abutting portion and into said recess to facilitate the ready sliding of said valve stem from said abutting portion into said recess upon said second trigger portion being moved to non-aligned position.

(References on following page)

References Cited

UNITED STATES PATENTS

| | | | |
|---|---|---|---|
| 2,488,224 | 11/1949 | Mothorn | 30—228X |
| 2,538,613 | 1/1951 | Alvino | 30—178 |
| 2,543,109 | 2/1951 | Holowka | 30—228 |
| 2,649,076 | 8/1953 | Dupre | 91—358 |

ROBERT C. RIORDON, Primary Examiner

J. C. PETERS, Assistant Examiner

U.S. Cl. X.R.

91—358; 173—66